United States Patent
Teraoka et al.

(10) Patent No.: US 7,626,912 B2
(45) Date of Patent: Dec. 1, 2009

(54) OPTICAL RECORDING MEDIUM, REPRODUCTION APPARATUS AND REPRODUCTION METHOD

(75) Inventors: Yoshiyuki Teraoka, Kanagawa (JP); Minoru Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 11/384,522

(22) Filed: Mar. 21, 2006

(65) Prior Publication Data

US 2006/0250925 A1    Nov. 9, 2006

(30) Foreign Application Priority Data

Apr. 11, 2005    (JP) .............................. 2005-113197

(51) Int. Cl.
*G11B 7/00*    (2006.01)
(52) U.S. Cl. .................... 369/103; 369/275.1; 369/47.1
(58) Field of Classification Search .................. None
See application file for complete search history.

(56) References Cited

U.S. PATENT DOCUMENTS 4,550,395 A * 10/1985 Carlson ...................... 369/103

6,862,120 B2 * 3/2005 Tanaka et al. .................. 359/7

FOREIGN PATENT DOCUMENTS

| JP | 4-93881 | 3/1992 |
|---|---|---|
| JP | 6-301326 | 10/1994 |
| JP | 11-344918 | 12/1999 |
| JP | 2003-178461 | 6/2003 |
| JP | 2005-11488 | 1/2005 |

* cited by examiner

*Primary Examiner*—Muhammad N. Edun
(74) *Attorney, Agent, or Firm*—Oblon, Spivak, McClelland, Maier & Neustadt, P.C.

(57) ABSTRACT

An optical recording medium which has an enhanced appearance or an enhanced design performance while computer data are recorded and a reproduction apparatus and method in which the optical recording medium is used are disclosed. When computer data are recorded on the optical recording medium on which recording data are recorded as interference fringes formed through interference of object light of images with reference light, related information of the recording data is recorded in a state wherein it can be recognized through the visual sense of the user.

20 Claims, 12 Drawing Sheets

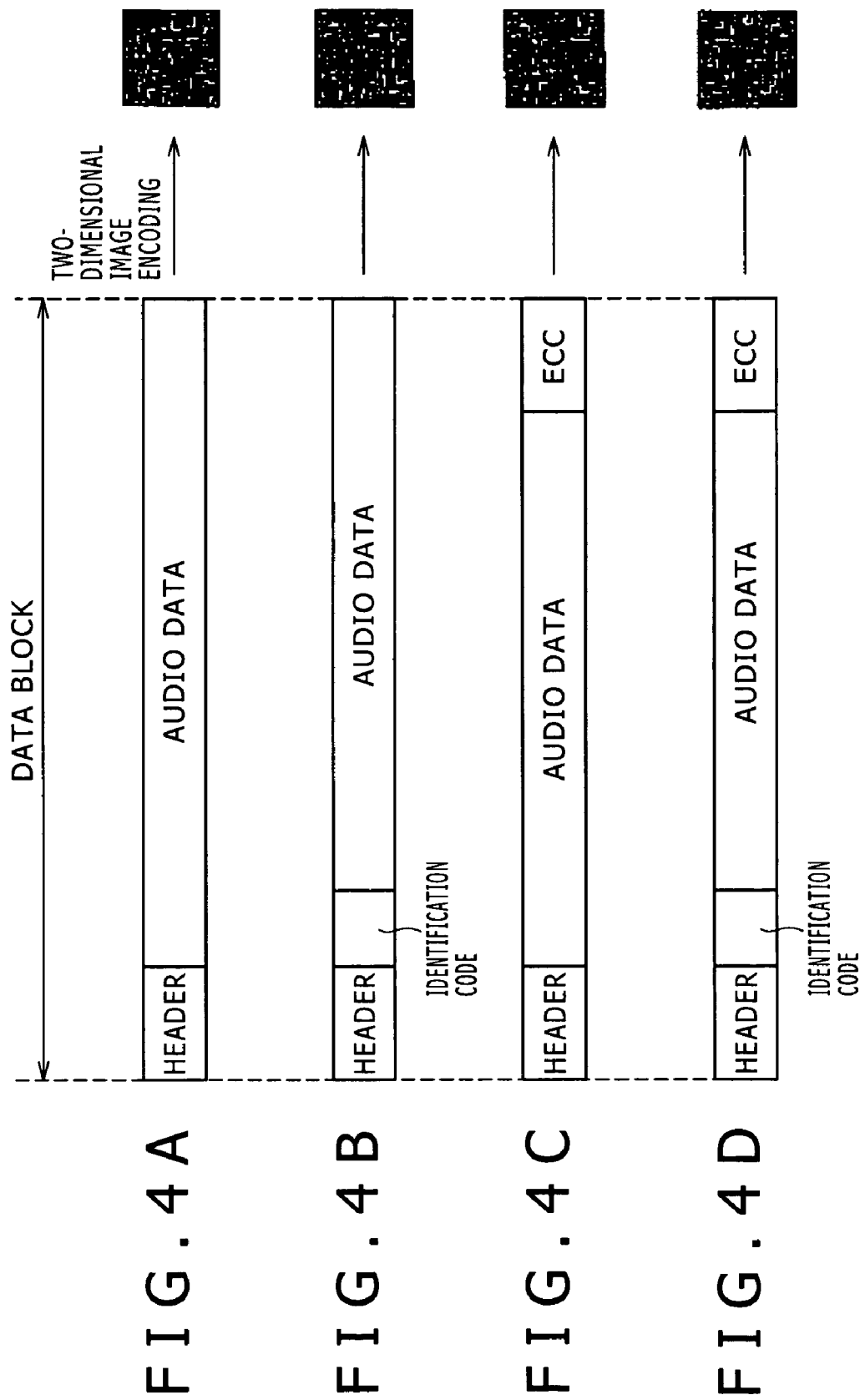

OPTICAL RECORDING MEDIUM, REPRODUCTION APPARATUS AND REPRODUCTION METHOD

CROSS REFERENCES TO RELATED APPLICATIONS

The present invention contains subject matter related to Japanese Patent Application JP 2005-113197 filed in the Japanese Patent Office on Apr. 11, 2005, the entire contents of which being incorporated herein by reference.

BACKGROUND OF THE INVENTION

This invention relates to an optical recording medium on which recording data are recorded as interference fringes formed through interference of object light of images corresponding to the recording data with reference light, and a reproduction apparatus and a reproduction method for an optical recording medium of the type described.

A hologram recording medium is conventionally known in which images which can be visually recognized, for example, three-dimensionally or like images are recorded as interference fringes of object light and reference light. For example, Japanese Patent No. 3596174 (hereinafter referred to as Patent Document 1) and Japanese Patent No. 3498878 (hereinafter referred to as Patent Document 2) disclose a holographic stereogram system as a technique of hologram recording wherein a large number of images as a subject copy are successively recorded as rectangular or dot-shaped elementary holograms on a single hologram recording medium. According to the holographic stereogram, since information of a plurality of images obtained by successively picking up images of a subject from observation points different from each other in a transverse direction is successively recorded such that it continues in the transverse direction as rectangular elementary holograms, when an observing person watches the holographic stereogram with both eyes, two-dimensional images which look to the left and right eyes are a little different from each other. Consequently, the observing person feels a parallax, and a three-dimensional image is reproduced.

SUMMARY OF THE INVENTION

Incidentally, also it is known that a hologram recording medium can enhance the recording density significantly and achieve a very great storage capacity. Therefore, it is considered that the hologram recording medium is useful not only for reproduction of a three-dimensional image but also as a recording medium for recording various data such as, for example, computer data. For example, where the graphic stereogram system described above is applied, computer data are converted into two-dimensional images for individual predetermined recording units. For example, such an image pattern as a two-dimensional barcode or a QR code (trademark) which is a kind of two-dimensional barcode is produced. Then, a large number of image patterns are produced as two-dimensional images for individual recording units and are individually recorded as rectangular elementary holograms successively. Such recording as just described makes it possible to significantly enhance the recording density when compared with that of the conventional two-dimensional barcodes by printing.

However, naturally it is presupposed that, where computer data are recorded on a hologram recording medium in such a manner as described above, the data are reproduced by a reading apparatus for exclusive use at all, and the visibility of the hologram recording medium is not taken into consideration. In other words, where computer data are recorded on the hologram recording medium, when a person looks at the hologram recording medium, only a random dot pattern similar to a two-dimensional barcode looks to the eye of the person.

Further, since, different from a disk or the like, it is difficult to allow a person to grasp recorded contents of the hologram recording medium through a jacket photograph applied thereto, it is difficult for the person to visually confirm information relating to data recorded on the hologram recording medium.

There is a need for providing an optical recording medium such as a hologram recording medium which has an enhanced appearance or an enhanced design performance while computer data are recorded and a reproduction apparatus and a reproduction method in which the optical recording medium is used.

In order to meet the need described above, according to an embodiment of the present invention, there is provided an optical recording medium on which recording data are recorded as interference fringes formed through interference of object light of images obtained for individual recording units from the recording data with reference light, including a recording region in which recording data of a first form are recorded, and another recording region in which recording data of a second form are recorded.

According to another embodiment of the present invention, there is provided a reproduction apparatus for reproducing an optical recording medium on which recording data are recorded as interference fringes formed through interference of object light of images obtained for individual recording units from the recording data with reference light, the optical recording medium having recorded thereon recording data of a first form which are computer data to be processed by an information processing apparatus and recording data of a second form which are image data which can be recognized with the visual sense of a human being in a state where the recording data of the second form are recorded on the optical recording medium, including a reference light outputting section for outputting reading out reference light, a detection section for detecting reproduction images of individual recording units recorded on the optical recording medium while the reading out reference light is applied to the optical recording medium by the reference light outputting section, and a reproduction processing section for converting the reproduction images of the individual recording units detected by the detection section into a data string and for extracting only the data of the first form from the data string and processing the extracted data as reproduction data.

According to a further embodiment of the present invention, there is provided a reproduction method for reproducing an optical recording medium on which recording data are recorded as interference fringes formed through interference of object light of images obtained for individual recording units from the recording data with reference light, the optical recording medium having recorded thereon recording data of a first form which are computer data to be processed by an information processing apparatus and recording data of a second form which are image data which can be recognized with the visual sense of a human being in a state where the recording data of the second form are recorded on the optical recording medium, including the steps of detecting reproduction images of individual recording units recorded on the optical recording medium while reading out reference light is applied to the optical recording medium, and converting the reproduction images of the individual recording units detected by the detection step into a data string and for extracting only the data of the first form from the data string and processing the extracted data as reproduction data.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4A is a schematic view illustrating a first data block as a recording unit of audio data;

FIG. 4B is a schematic view illustrating a second data block as a recording unit of audio data;

FIG. 4C is a schematic view illustrating a third data block as a recording unit of audio data;

FIG. 4D is a schematic view illustrating a fourth data block as a recording unit of audio data;

DETAILED DESCRIPTION OF THE PREFERRED EMBODIMENT

Figure 1A:
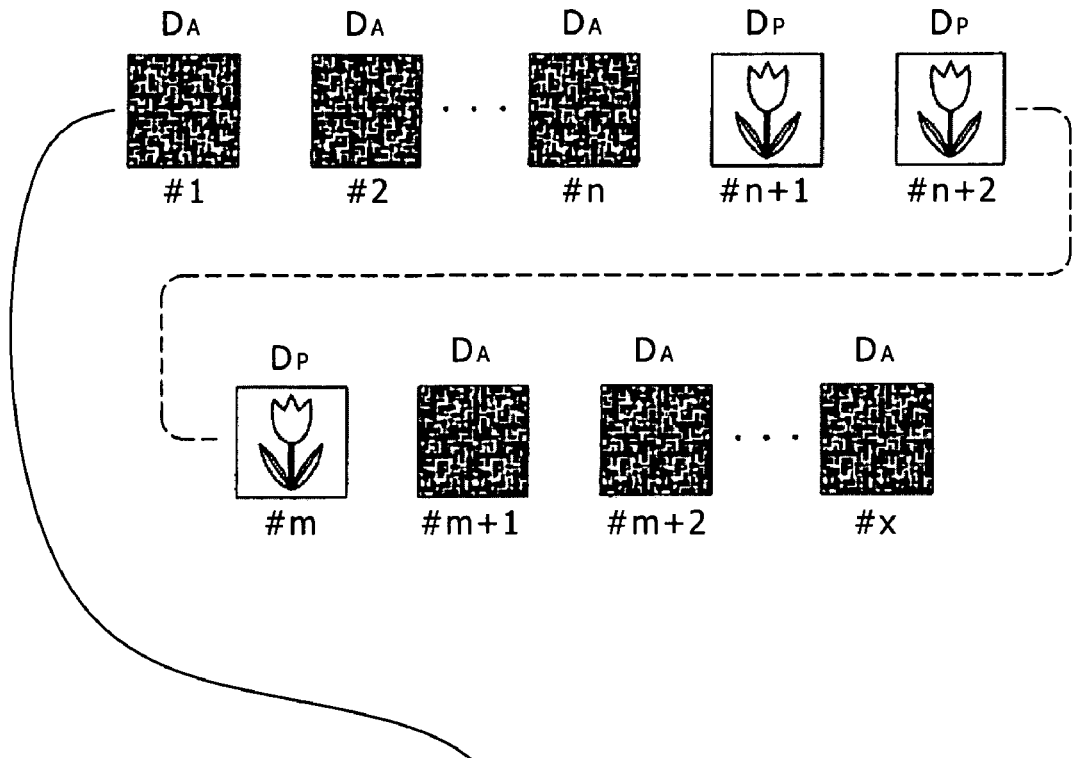
FIG. 1A is a schematic view illustrating audio data and images recorded in a mixed manner in a hologram memory to which the present invention is applied.

In the following, a preferred embodiment of the present invention is described in the following order.
1. Hologram memory of the holographic stereogram system
2. Production of the hologram memory
3. Configuration of the reproduction apparatus
4. Reproduction operation for the hologram memory
5. Hologram memory and reproduction operation of other systems
6. Effects of the embodiment and modifications 1. Hologram Memory of the Holographic Stereogram System The optical recording medium according to the present invention is applied as a hologram memory into which data are recorded as interference fringes produced using object light and reference light. While various types of hologram memories are available, a hologram memory of the holographic stereogram system is used in the present embodiment.

In the hologram memory of the present embodiment, computer data as recoding data of a first form which are to be processed by a computer apparatus and other information processing apparatus and image data as recording data of a second form which can be recognized, in a state wherein they are recorded in the hologram memory, with the visual sense of a human being, are recorded in a mixed manner. It is to be noted that the "image data" described below as an example of the recording data of the second form are, unless otherwise specified, data recognized as an image with the visual sense when the user looks at the hologram memory, but are not data of an image of an object of reading and image processing by a reproduction apparatus hereinafter described. Although it is possible to record "image data" for the computer use which are processed by an information processing apparatus, in this instance, the "image data" are an example of computer data and correspond to recording data of the first form in the present embodiment. Further, in the following description, audio data is used as an example of computer data which is recording data of the first form.

As conventionally known, where a visually recognizable three-dimensional image is to be recorded into a hologram memory of the holographic stereogram system, images of an object picked up from various angular directions are recorded like vertical zones on a hologram material. Therefore, if reference light is illuminated on the recorded holograms, then different images can be observed depending upon the angle of observation and are generally recognized as a three-dimensional image by the observing person. In the present embodiment, as hologram elements to be recorded as vertical zones on a hologram material, audio data and image data are recorded in a mixed manner by partly recording image data and partly recording audio data.

Figure 1B:
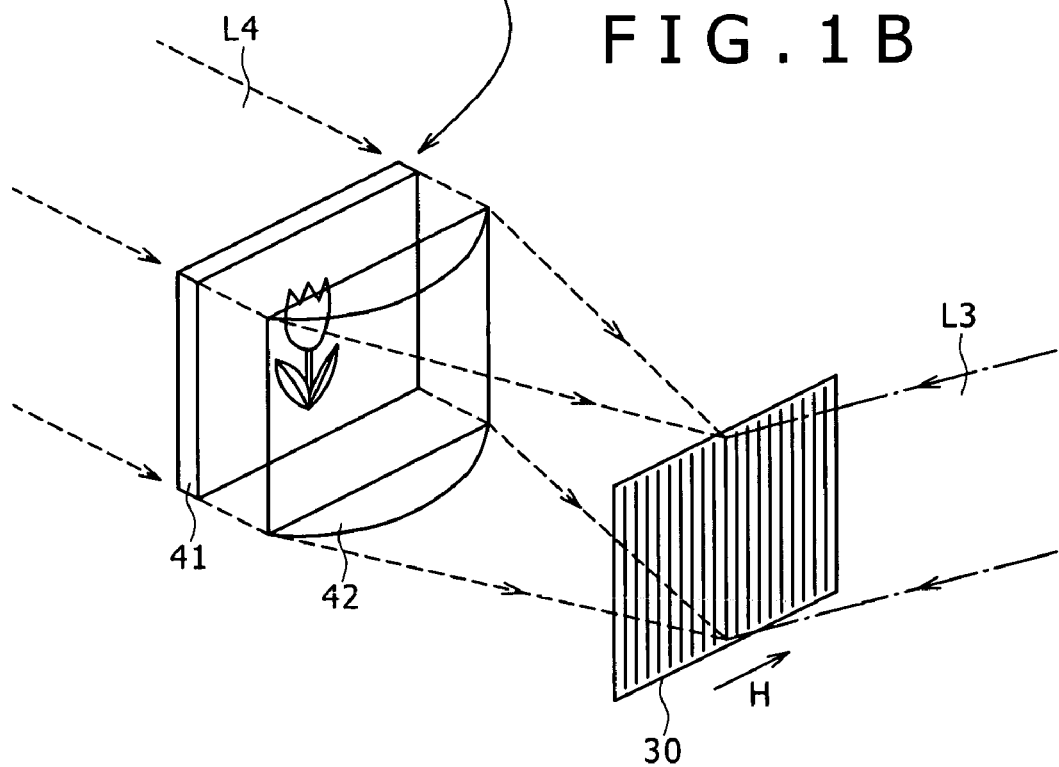
FIG. 1B is a schematic view illustrating recording of data into the hologram memory.

FIG. 1A schematically illustrates that audio data and image data are recorded in a mixed manner in a hologram memory. FIG. 1B illustrates a manner in which hologram elements are recorded in zones on a hologram material 30. Object light L4 and reference light L3 for recording are illuminated on the hologram material 30. The object light L4 is illuminated on a display apparatus 41 of the transmission type, which may be formed, for example, from a liquid crystal panel while an image is displayed on the display apparatus 41. The object light L4 having transmitted through the display apparatus 41 makes object light which reflects the image displayed on the display apparatus 41, and this object light L4 is converted into a line extending in a vertical direction by a cylindrical lens 42 and then illuminated on the hologram material 30. Interference fringes when the object light L4 converted into a line in this manner and the reference light L3 interfere with each other are recorded as a zone-like hologram element extends in a vertical direction as seen in FIG. 1B.

In order to successively produce such zone-like hologram elements, the hologram material 30 is fed step by step, for example, in the direction indicated by an arrow mark H and the image to be displayed on the display apparatus 41 is successively changed. Consequently, zone-like hologram elements as interference fringes are formed in a lattice-like fashion on the hologram material 30. At this time, if images of a certain object picked up from various angles are successively displayed on the display apparatus 41 so as to be recorded individually as hologram elements, then the recorded hologram elements look as a three-dimensional image when they are visually recognized. In the present example, the images to be displayed on the display apparatus 41 include patterns by which audio data are represented like a two-dimensional barcode. In other words, audio data are converted into pattern images like a two-dimensional barcode, and such pattern images are determined as hologram elements to be recorded.

FIG. 1A illustrates an example of images to be successively displayed on the display apparatus 41. The display apparatus 41 successively displays images based on audio data DA and image data DP. Each image based on the audio data DA is an image like a two-dimensional barcode as seen in FIG. 1A. Original audio data to be recorded are divided into recording units, for example, of a data size of a fixed length, and the audio data of each recording unit is converted into a two-dimensional barcode image pattern. Where an image pattern in the form of a two-dimensional barcode is displayed on the display apparatus 41, the object light L4 which reflects the image pattern is illuminated on the hologram material 30, in which a linear hologram element on which the image pattern is recorded in the form of interference fringes between the object light L4 and the reference light L3 is formed. In other words, one recording unit of the audio data DA is recorded on the hologram material 30. Thus, if images based on the audio data DA and images based on the image data DP obtained by image pickup of a certain subject are successively displayed in a predetermined order (#1 to #x) on the display apparatus 41 to successively form hologram elements on the hologram material 30 as seen in FIG. 1A, then a hologram memory in which the audio data DA and the image data DP are recorded in a mixed manner can be formed.

Figure 2:
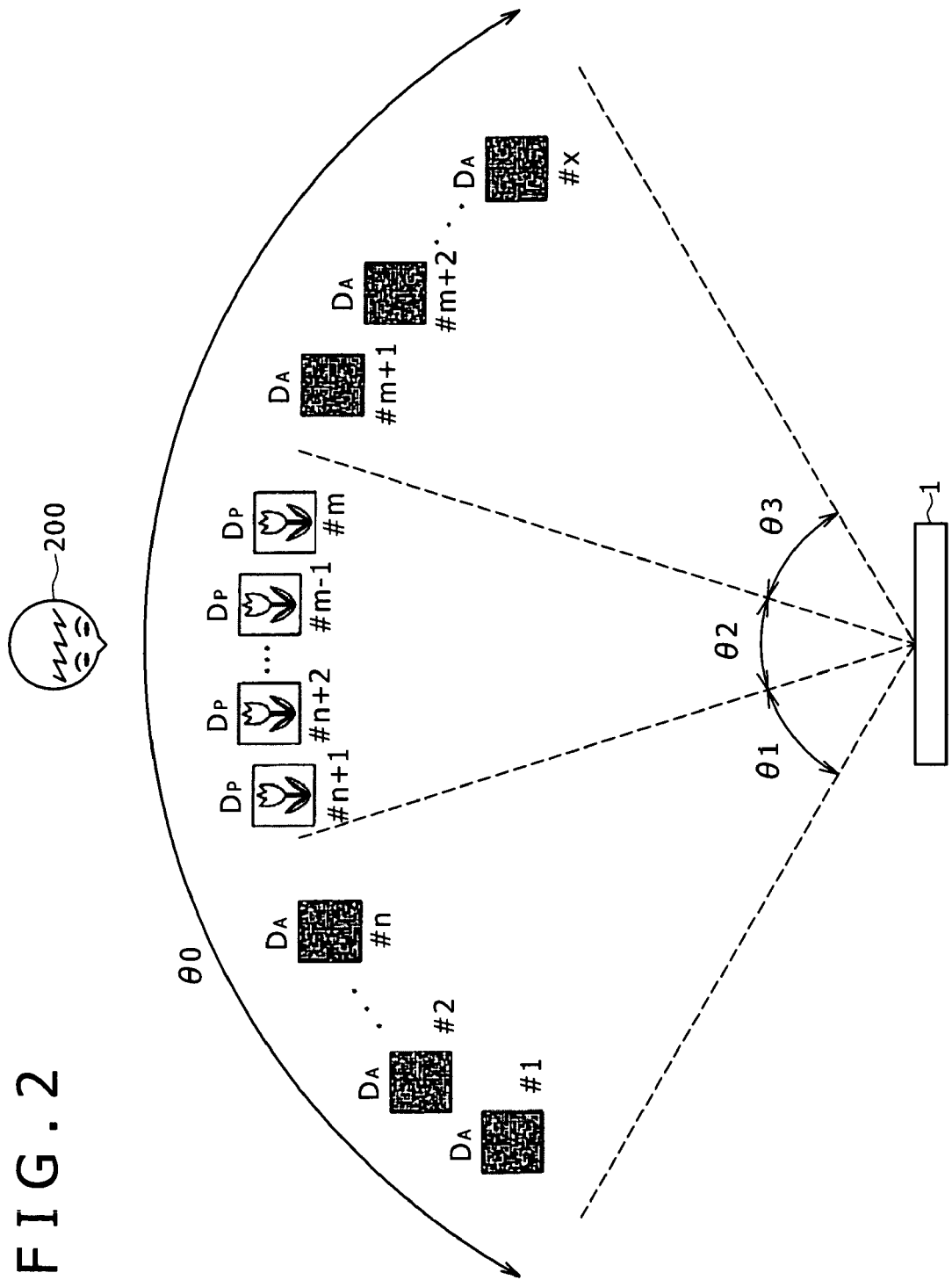
FIG. 2 is a schematic view showing reproduced images of the hologram memory.

FIG. 2 illustrates a manner of the hologram memory 1 formed in such a manner as described above. Data recorded as hologram elements appear as an image which can be visually recognized by a person on the hologram memory 1. In this instance, to the hologram memory 1, external light such as light from a light source disposed in a certain direction or natural light from therearound serves as reference light. Where the audio data DA and the image data DP are recorded in the order of #1 to #x as seen in FIG. 1A, image patterns of the audio data DA #1 to #n can be visually recognized from a range of an angle θ1 with respect to the hologram memory 1 as seen in FIG. 2. Meanwhile, in another range of an angle θ2 which is a substantially front direction, images of the image data DP #n+1 to #m can be visually recognized. Further, from within a range of an angle θ3, an image pattern of the audio data DA #m+1 to #x can be visually recognized.

Although any image pattern derived from the audio data DA is not an image whose substance can be recognized in significance by a person like a two-dimensional barcode, images derived from the image data DP can be recognized by a person 200 who faces the hologram memory 1 substantially from the front. The image patterns derived from the audio data DA are read and processed by a reproduction apparatus. The reproduction apparatus successively reads the images within the reading range θ0 shown in FIG. 2 by means of an image sensor. In particular, the reproduction apparatus successively reads image patterns derived from the audio data DA of #1 to #n, images of the image data DP of #n+1 to #m and image patterns derived from the audio data DA of #m+1 to #x. For example, the position of a lens system of the reproduction is successively moved or the position of reference light for reading out is successively moved while the optical images are successively read by means of the image sensor. Then, the image patterns are decoded into data. At this time, in a procedure of the data processing in the reproduction apparatus, the image data DP of #n+1 to #m are abandoned, but only data of recording units of the audio data DA decoded from the read out image patterns of #1 to #n and #m+1 to #x are extracted. Then, stream data as the audio data DA are produced from the data of the recording units.

Thus, the hologram memory 1 of the present embodiment can record therein a sufficient amount of computer data such as audio data DA making the most of its characteristic of high density recording of a hologram memory. Furthermore, since the image itself can be recognized by the person 200 when the person 200 looks at the hologram memory 1 substantially from the front, the hologram memory 1 itself has a superior design performance. Further, for example, where it is supposed to record audio data DA, if the audio data DA as music data are recoded and an artist photograph or a jacket image of the music is recorded as the image data DP into the hologram memory 1, then the hologram memory 1 can be provided with high value added. For example, it is possible for the user to recognize an artist or the substance of music from an image which can be visually observed on the hologram memory 1 while the music itself (audio data DA) is successively read by the reproduction apparatus.

It is to be noted that, naturally, if an image which can be visually observed within a certain angular range is used as the image of the image data DP, the recording capacity for computer data such as audio data DA decreases by an amount corresponding to the amount of the recorded image data DP. However, conversely speaking, after a capacity necessary for recording of the audio data DA is set, the image data DP should be recorded by an amount corresponding to the remaining capacity. In other words, within what angular range an effective image should be able to be observed in design (what recording capacity should be allocated to image data DP) should be determined taking the amount of computer data to be recorded and the point of view on design into consideration. Further, it is not always necessary to make it possible for an image derived from image data DP to be visually observed in a direction from the front, and for example, it is a possible idea to make it possible for an image derived from image data DP to be recognized only when the person 200 looks at the hologram memory 1 from an oblique direction.

2. Production of the Hologram Memory

Now, a data recording apparatus for forming such a hologram memory 1 as described above, that is, a holographic stereogram production system, is described. The holographic stereogram production system is a system for producing a one-step holographic stereogram, which uses a hologram material 30 in the form of a film on which interference fringes between object light and reference light are recorded as they are as a holographic stereogram (hologram memory 1).

Figure 3:
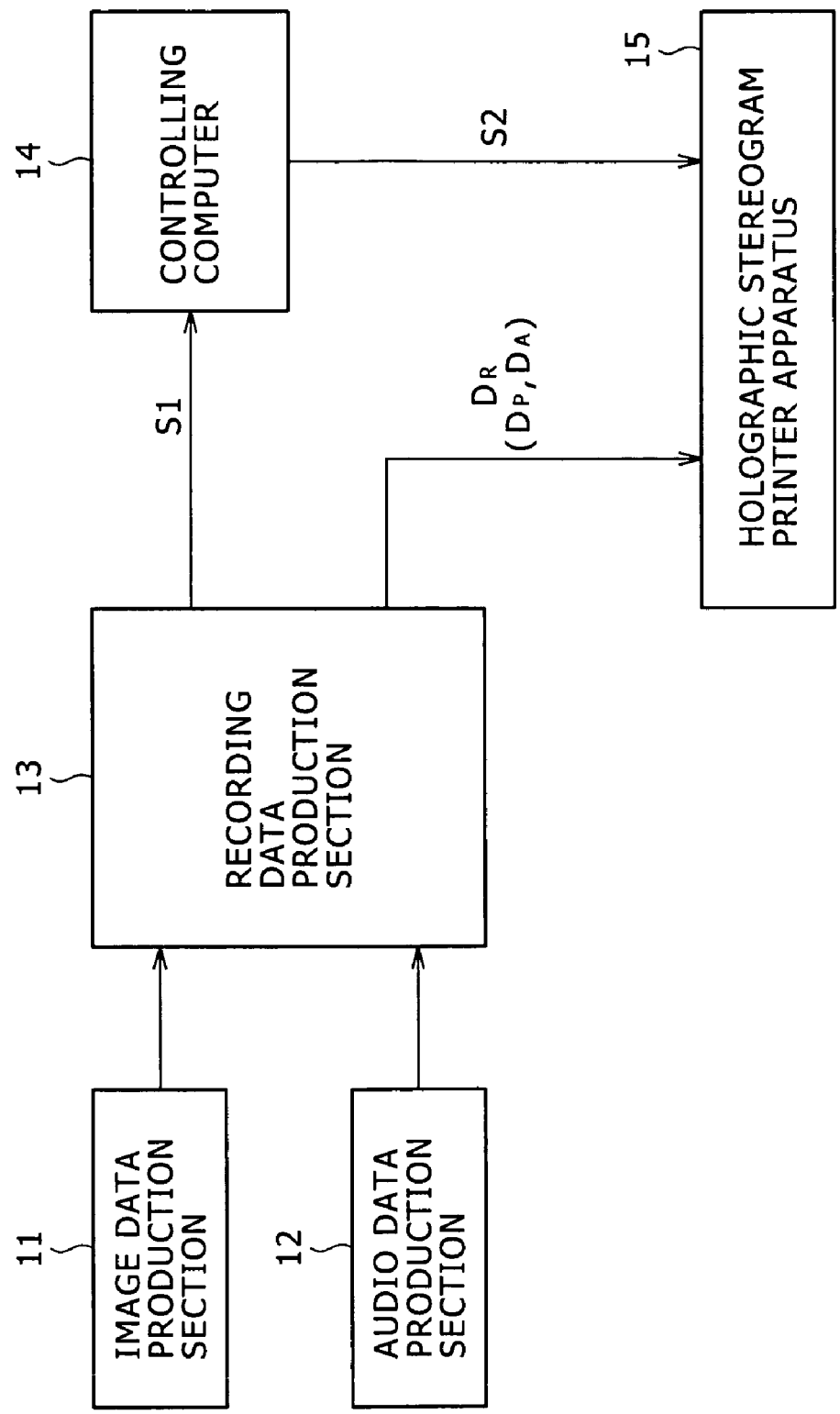
FIG. 3 is a block diagram of a reproduction system for the hologram memory.

Referring to FIG. 3, the holographic stereogram production system includes an image data production section 11 for producing image data DP of an image to be recorded on the hologram material 30, an audio data production section 12 for producing audio data DA to be recorded on the hologram material 30, and a recording data production section 13 for successively outputting images of the image data DP and image patterns of the audio data DA as recording data. The holographic stereogram production system further includes a controlling computer 14 for controlling the entire system, and a holographic stereogram printer apparatus 15 including an optical system for producing a holographic stereogram.

The image data production section 11 produces image data DP of a plurality of images corresponding to a plurality of elementary holograms to be recorded on the hologram material 30. In particular, the image data production section 11 produces a plurality of image data DP as #n+1 to #m shown in FIGS. 1A and 2. In order to form an image to be recorded and visually recognized on the hologram memory as a three-dimensional image, the image data production section 11 may form the image data DP of #n+1 to #m into images of a parallax image train.

The audio data production section 12 divides audio stream data from an audio source into recording units of a predetermined data size. Then, the audio data DA are converted into a two-dimensional pattern for each recording unit. In other words, the audio data production section 12 produces data as a plurality of image patterns based on the audio data DA as #1 to #n and #m+1 to #n described hereinabove with reference to FIGS. 1A and 2. FIGS. 4A to 4D illustrate different examples of processing of audio data DA by the audio data production section 12. A data block shown in FIGS. 4A to 4D represents a recording unit produced by extracting audio data of stream data for every predetermined size. FIG. 4A illustrates an example wherein a header is added to audio data of a predetermined data amount to produce a data block and the produced data block is used as a unit to be recorded as one hologram element. The header has an attribute, a block number, a data size and so forth of the audio data recorded therein. For the audio data, data obtained from the audio source may be used as they are or may be used after they are compressed by a predetermined compression method or are encoded for recording. Further, the audio data may be used after they are encrypted by a predetermined encryption method. FIG. 4B illustrates another example wherein a data block in which an identification code is recorded together with the header and audio data described above is produced. The identification code is code information for identifying a hologram element recorded on the hologram memory 1 from image data DP and hence indicates that the corresponding information is a data block in which audio data DA is recorded. FIG. 4C illustrates an example wherein a data block is formed from a header, audio data and an error correction code (ECC). In particular, audio data in a data block is encoded for error correction and an ECC parity for the code is recorded so that, upon reproduction, an error correction can be performed in a unit of a data block. FIG. 4D illustrates an example wherein a data block is formed from a header, an identification code, audio data and an error correction code. The audio data production section 12 successively produces a data for one recording unit, for example, as seen in one of the examples of FIGS. 4A to 4D from audio stream data supplied thereto from a data source and converts and outputs the produced data blocks into and as data of two-dimensional image patterns.

The recording data production section 13 fetches image patterns derived from the image data DP from the image data production section 11 and the audio data DA from the audio data production section 12 and arrays the data in the order of #1 to #x to produce recording data DR. Then, upon recording on the hologram material 30, the recording data production section 13 successively signals the recording data DR (data of image patterns based on the image data DP and the audio data DA) in the order of #1 to #x to the holographic stereogram printer apparatus 15 and signals, every time the recording data DR are signaled to the holographic stereogram printer apparatus 15, a timing signal S1 representing such signaling of the data to the controlling computer 14.

The controlling computer 14 drives the holographic stereogram printer apparatus 15 based on the timing signal S1 from the recording data production section 13 to successively record images based on the recording data DR outputted from the recording data production section 13 as rectangular elementary holograms on the hologram material 30 set in position in the holographic stereogram printer apparatus 15. At this time, the controlling computer 14 controls a shutter mechanism, a recording medium feeding mechanism and other pertaining mechanisms provided in the holographic stereogram printer apparatus 15 as hereinafter described. In particular, the controlling computer 14 signals a control signal S2 to the holographic stereogram printer apparatus 15 to control opening/closing of the shutter, a feeding movement of the hologram material 30 by the recording medium feeding mechanism and so forth.

Figure 5A:
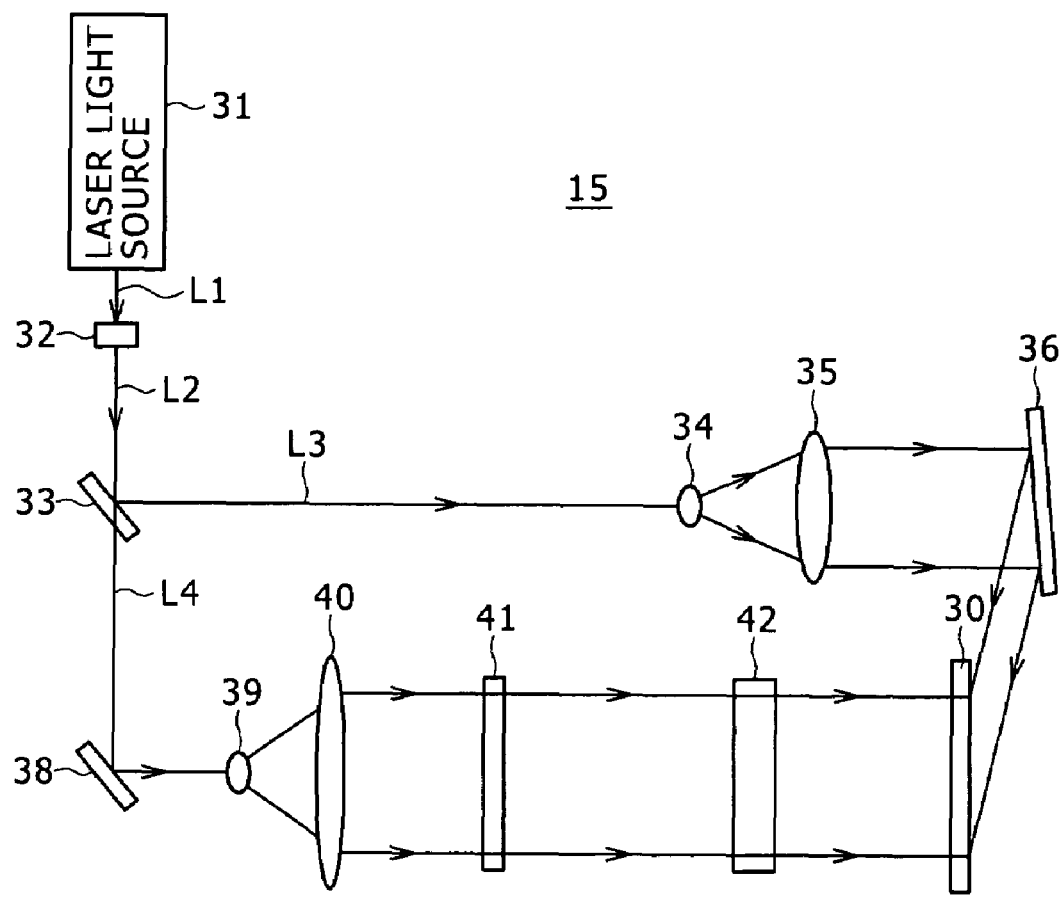
FIG. 5A is a schematic view of an optical system of a holographic stereogram printer for forming the hologram memory as viewed from above.
Figure 5B:
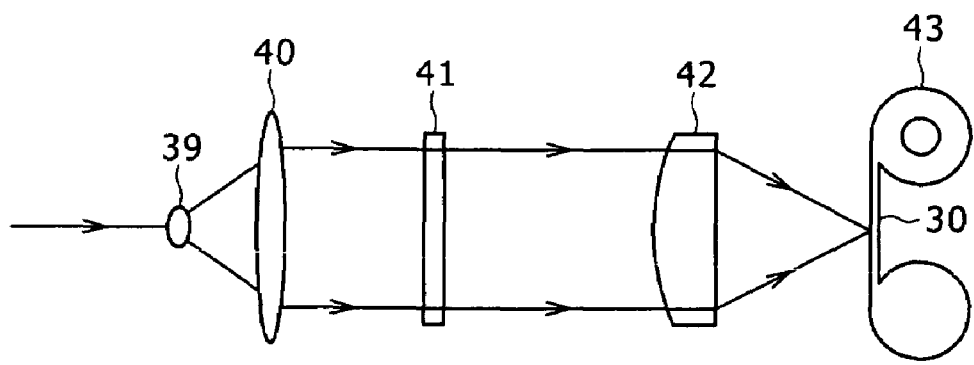
FIG. 5B is a schematic view of the optical system of the holographic stereogram printer as viewed from sidewardly.

The holographic stereogram printer apparatus 15 includes an optical system, for example, shown in FIGS. 5A and 5B. It is to be noted that FIG. 5A shows the optical system of the entire holographic stereogram printer apparatus 15 as viewed from above, and FIG. 5B shows a portion of the optical system of the holographic stereogram printer apparatus 15 for object light as viewed from sidewardly.

Referring first to FIG. 5A, the holographic stereogram printer apparatus 15 includes a laser light source 31 for emitting a laser beam of a predetermined wavelength, and a shutter 32 and a half mirror 33 disposed on an optical axis of a laser beam L1 from the laser light source 31. The shutter 32 is controlled by the controlling computer 14 such that it is closed when the hologram material 30 is not to be exposed but is open when the hologram material 30 is to be exposed. The half mirror 33 is provided to split a laser beam L2 having transmitted through the shutter 32 into reference light and object light. The reference light L3 reflected by the half mirror 33 is used as the reference light, and the object light L4 having transmitted through the half mirror 33 is used as the object light.

An optical system for the reference light is disposed on the optical axis of the reference light L3 reflected by the half mirror 33. The optical system for the reference light includes a cylindrical lens 34, a collimator lens 35 for converting the reference light into parallel light, and a total reflection mirror 36 for reflecting the parallel light from the collimator lens 35, disposed in order. The light reflected by the half mirror 33 is first converted into divergent light by the cylindrical lens 34. Then, the divergent light is converted into parallel light by the collimator lens 35. Thereafter, the parallel light is reflected by the total reflection mirror 36 and enters as reference light into the hologram material 30.

Meanwhile, an optical system for the object light is disposed on the optical axis of the object light L4 having transmitted through the half mirror 33. Referring to FIGS. 5A and 5B, the optical system for the object light includes a total reflection mirror 38 for reflecting the transmitted light from the half mirror 33, a spatial filter 39 formed from a combination of a convex lens and a pinhole, a collimator lens 40 for converting the object light into parallel light, a display apparatus 41 for displaying an image of an object of recording, and a cylindrical lens 42 for focusing the object light on the hologram material 30, disposed in order. The object light L4 having transmitted through the half mirror 33 is first reflected by the total reflection mirror 38 and then converted into divergent light from a point light source by the spatial filter 39. Then, the divergent light is converted into parallel light by the collimator lens 40 and the comes to the display apparatus 41. The display apparatus 41 is an image display apparatus of the transmission type formed from, for example, a liquid crystal panel and displays an image based on recording data DR sent thereto from the recording data production section 13. Then, the light having transmitted through the display apparatus 41 is modulated in accordance with the image displayed on the display apparatus 41 and comes to the cylindrical lens 42.

The light having transmitted through the display apparatus 41 is converged in a transverse direction by the cylindrical lens 42, and the converged light enters as object light into the hologram recording medium 30. In short, in the present holographic stereogram printer apparatus 15, projection light from the display apparatus 41 enters as rectangular object light into the hologram recording medium 30.

Here, the reference light and the object light are set such that the reference light enters one of principal faces of the hologram material 30 while the object light enters the other principal face of the hologram material 30. In other words, the reference light is introduced at a predetermined incident angle to one principal face of the hologram material 30 while the object light is introduced to the other principal face of the hologram material 30 such that the axis thereof may be substantially perpendicular to the hologram material 30. Consequently, the reference light and the object light interfere with each other on the hologram material 30, and interference fringes produced by the interference are recorded as variations in refractive index in the hologram material 30.

The holographic stereogram printer apparatus 15 further includes a recording medium feeding mechanism 43 capable of intermittently feeding the hologram material 30 under the control of the controlling computer 14. The recording medium feeding mechanism 43 intermittently feeds the hologram material 30, which is in the form of a film and set in a predetermined condition on the recording medium feeding mechanism 43, by a distance corresponding to the size of one elementary hologram in accordance with the control signal S2 from the controlling computer 14 every time one image based on recording data DR outputted from the recording data production section 13 is recorded as one elementary hologram. As a result, images based on the recording data DR successively outputted from the recording data production section 13 (that is, image patterns based on the image data DP and the audio data DA) are successively recorded as elementary holograms such that they continue in the transverse direction on the hologram material 30.

As described above, in the present holographic stereogram production system, a plurality of exposure images based on recording data DR outputted from the recording data production section 13 are successively displayed on the display apparatus 41, and the shutter 32 is opened for every image such that the images are successively recorded as rectangular elementary holograms on the hologram material 30. At this time, since the hologram material 30 is fed by a one-elementary hologram distance for every one image, the elementary holograms are juxtaposed with each other in the transverse direction. Consequently, as the image data DP, a plurality of images including, for example, parallel information in the transverse direction are recorded as a plurality of transversely continuing elementary holograms on the hologram material 30, and a holographic stereogram having a parallax in the transverse direction is obtained. Also image patterns derived from the audio data DA are recorded as a plurality of elementary holograms continuing in the transverse direction similarly. Then, the hologram material 30 on which the recording data DR are recorded by the holographic stereogram production system makes the hologram memory 1 of the present embodiment described hereinabove with reference to FIG. 2.

3. Configuration of the Reproduction Apparatus

Now, a reproduction apparatus for the hologram memory 1 of the present embodiment in which images of image data DP and audio data DA are recorded as seen in FIG. 2 is described. As described hereinabove, an image according to the image data DP recorded in the hologram memory 1 is visually recognized directly by the user, and the reproduction apparatus of the present embodiment is used to reproduce the computer data recorded in the hologram memory 1, that is, the audio data DA in the embodiment described above, from the hologram memory 1.

Figure 6A:
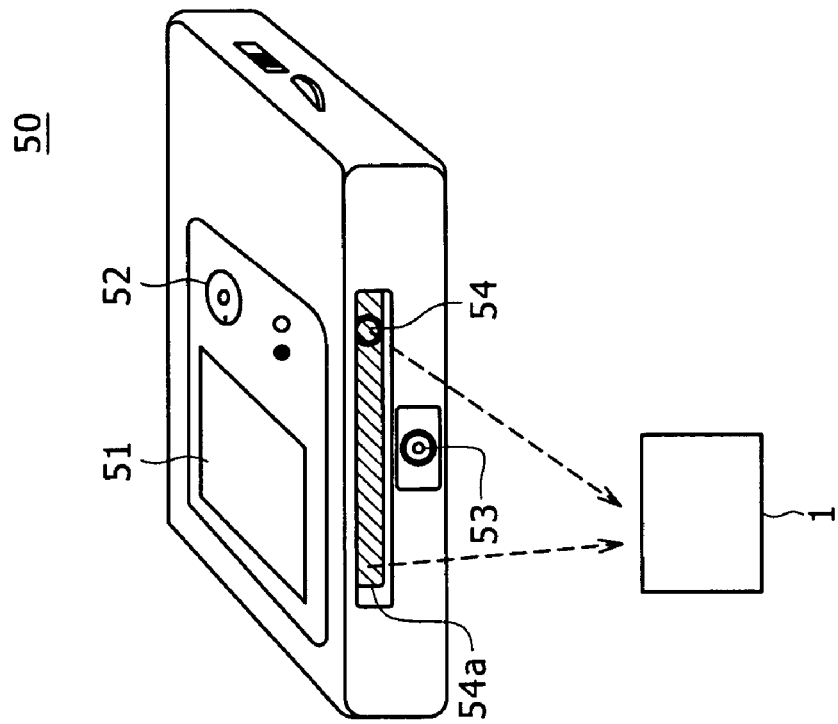
FIGS. 6A and 6B are schematic perspective views showing different examples of an appearance of a reproduction apparatus to which the present invention is applied.
Figure 6B:
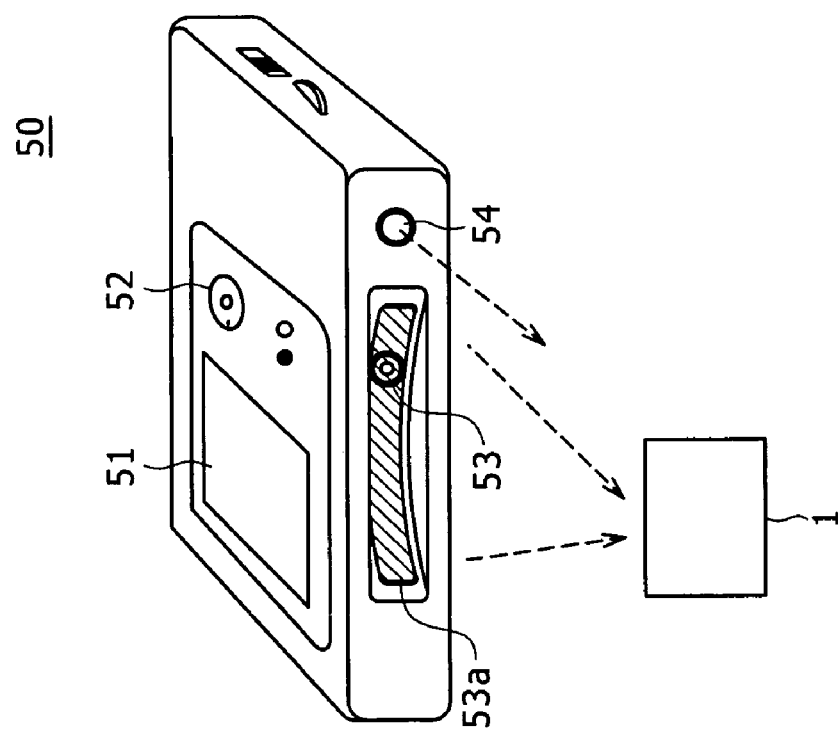

FIGS. 6A and 6B show different examples of the reproduction apparatus 50 of the present embodiment each formed as a hologram memory reader. Referring to FIGS. 6A and 6B, the reproduction apparatus 50 includes a housing, for example, of such a small size that it can be carried by the user, and further includes a display section 51 and an operation section 52 for the user interface on the housing. In order to read out data from the hologram memory 1, an image pickup lens system 53 and a light emitting element (for example, LED) 54 for irradiating reference light for reading are provided, for example, on one side face of the housing. As described hereinabove with reference to FIG. 2, the reproduction apparatus 50 performs reading scanning of the hologram memory 1 within the reading range θ0. To this end, in the case of the reproduction apparatus 50 shown in FIG. 6A, the position of the light emitting element 54 is fixed while a mechanism for moving the position of the image pickup lens system 53 is provided as a lens moving section 53a. On the other hand, in the case of the reproduction apparatus 50 shown in FIG. 6B, the image pickup lens system 53 is fixed while a light emitting element moving section 54a for moving the position of the light emitting element 54 is provided. An example of a scanning operation upon reading is hereinafter described.

A configuration of the reproduction apparatus 50 is described with reference to FIG. 7. The reproduction apparatus 50 includes a system controller 61 which is formed from, for example, a microcomputer and controls components of the reproduction apparatus 50 in order to execute a reading operation of audio data DA from the hologram memory 1. Further, the system controller 61 supervises operation information of the operation section 52 and executes necessary control in response to an operation of the operation section 52 by the user. Further, the system controller 61 controls the display section 51 to execute displaying of various kinds of information to be presented to the user.

A reading mechanism section 56 includes the image pickup lens system 53, an imager 55, the light emitting element 54, and a scanning mechanism 74. The image pickup lens system 53 is an optical system composed of one or a plurality of lenses. In particular, the image pickup lens system 53 is composed of a single image pickup lens or a plurality of lenses including an image pickup lens and a focusing lens and introduces reproduction image light from the hologram memory 1 to the imager 55. The imager 55 is formed from a solid-state image pickup element array such as, for example, a CMOS image sensor or a CCD image sensor. The imager 55 receives light of a reproduction image incoming from the image pickup lens system 53 and coverts the received light into an electric signal.

The light emitting element 54 is formed from, for example, an LED and driven by a light emission driving circuit 75 to emit light. The light emitting element 54 is driven to emit light in response to an instruction of the system controller 61 when reproduction of the hologram memory 1 is to be performed by the reproduction apparatus 50. The scanning mechanism 74 moves the image pickup lens system 53 (image pickup lens system 53 and imager 55) within the lens moving section 53a provided, for example, in such a manner as seen in FIG. 6A. Or, the scanning mechanism 74 moves the light emitting element 54 within the light emitting element moving section 54a provided, for example, in such a manner as seen in FIG. 6B.

A camera mechanism control section 67 controls and drives the reading mechanism section 56 in accordance with an instruction of the system controller 61 when the hologram memory 1 is to be reproduced. For example, the camera mechanism control section 67 performs focusing control of the lens system 53 or control of operation of the scanning mechanism 74.

A transfer control/signal processing section 62 controls operation of the imager 55 and processes a signal obtained by the imager 55. In particular, the transfer control/signal processing section 62 supplies a transfer timing signal, a transfer address signal and so forth to the imager 55 to cause the imager 55 to successively transfer and output a signal obtained as an image pickup signal from the solid-state image pickup element array. Then, the image pickup signal transferred from the imager 55 is outputted as image pickup data after a sampling process, an AGC process, an A/D conversion process and other necessary processes are applied thereto by the transfer control/signal processing section 62.

The image pickup data outputted from the transfer control/signal processing section 62 is accumulated into a DRAM 64 under the control of a memory controller 63. As a signal processing system for the image pickup data accumulated in the DRAM 64, an optical correction section 68, a geometrical distortion correction section 69, a binarization section 70 and a data processing section 71 are provided. Further, an SRAM 72 is used for communication of results of processes by the pertaining components and information necessary for processing with the system controller 61. Further, for example, set values and coefficients necessary for the signal processing by the pertaining components and other necessary information are stored into a flash memory 65.

The optical correction section 68 performs a process of correcting a variation of a data value brought about by an optical cause with image data obtained by the imager 55. The geometrical distortion correction section 69 performs a process of correcting geometrical distortion appearing on a reproduction image fetched as image pickup data. The binarization section 70 performs a process of converting image pickup data obtained by the imager 55 and having gradations into data of binary values of black and white. This is because data to be read from the hologram memory 1 are audio data DA of two-dimensional patterns and two-dimensional image patterns are obtained by first converting audio data DA into two-value data of black and white and then converting the two-value data into image patterns.

The data processing section 71 performs a decoding process for image pickup data binarized into a two-dimensional image pattern to obtain audio data. In particular, the data processing section 71 produces a data string as such a data block as described hereinabove with reference to any of FIGS. 4A to 4D from image data as a two-dimensional image pattern. From a data string obtained as a data block, the data processing section 71 extracts audio data DA in response to the header information. The data processing section 71 successively produces a data string as a data block from image pickup data of two-dimensional image patterns accumulated in the DRAM 64 and successively produces original audio stream data based on the audio data DA extracted from the data blocks. In this instance, if a data block includes an error correction code as described hereinabove with reference to FIG. 4C or 4D, then the data processing section 71 performs an error correction process for the audio data. Further, the data processing section 71 performs, for audio data DA extracted from any data block, a compression process or a decompression process corresponding to the compression process, an encoding or encrypting process for transmission or recording, a decoding or decrypting process corresponding to the encoding or encrypting process, and other necessary processes.

Incidentally, where all reproduction images of the hologram memory 1 within the reading range θ0 of FIG. 2 are fetched as image pickup data and accumulated into the DRAM 64, also reproduction images of image data DP are included as image pickup data. Therefore, the data processing section 71 discriminates whether each of the image pickup data accumulated in the DRAM 64 is image pickup data of a reproduction image of a two-dimensional image pattern of a data block including audio data DA or a reproduction image of image data DP, and performs also a process of abandoning the image pickup data if the image pickup data is a reproduction image of image data DP. For example, where the data block has the configuration of FIG. 4B or 4D, the data processing section 71 can discriminate whether the image pickup data is a reproduction image of audio data DA or a reproduction image of image data DP depending upon whether or not an identification code is included in the data block. On the other hand, where the data block has the configuration of FIG. 4C or 4D, the display apparatus 41 may discriminate that the image pickup data is a reproduction image of audio data DA if an error correction process can be performed correctly using an ECC parity but the image pickup data is a reproduction image of image data DP if such an error correction process as mentioned above cannot be performed correctly. Further, where the data block does not include an identification code as in the case of the data block of FIG. 4A nor includes an error correction code, the data processing section 71 may use a technique of confirming the format or the substance of data of the data block to perform a discrimination. For example, if certain information having predetermined significance is included in the header information, then the data processing section 71 may adopt the data block as a data block of audio data DA. Further, although, in order to join audio data extracted from data blocks together to produce audio stream data, data block numbers of the data blocks must be confirmed, since image data DP do not include data block numbers representative of order numbers in the stream data, the data processing section 71 may exclude data obtained from reproduction images of image data DP.

Audio stream data as audio data DA obtained by the data processing section 71 are transferred as reproduction data from the hologram memory 1 to an external apparatus such as, for example, a personal computer or an audio system through an external interface 66. The external interface 66 may be, for example, a USB interface. Naturally, the external interface 66 may otherwise be an interface according to a standard other than the USB standard. The user can cause the external apparatus to reproduce the fetched audio data to enjoy audio reproduction.

Alternatively, audio stream data as audio data DA obtained by the data processing section 71 may be supplied to a medium drive 73 and recorded on a recording medium 90. The recording medium 90 may be, for example, an optical disk, a magneto-optical disk or the like. For example, various recordable disks such as, for example, a CD (Compact Disk), a DVD (Digital Versatile Disk), a Blu-Ray Disk or an MD (Mini Disk) may be used as the recording medium 90. Where any of the disks mentioned is applied as the recording medium 90, the medium drive 73 performs an encoding process, an error correction code process, a compression process and so forth suitable for the disk type for audio data and records the resulting audio data on the disk. Also a hard disk may be applied as the recording medium 90. In this instance, the medium drive 73 is formed as a hard disk drive (HDD). Or else, the recording medium 90 may be implemented using a portable memory card having a solid-state memory built therein or a built-in type solid-state memory. In this instance, the medium drive 73 is formed as a recording apparatus for such a memory card or a built-in type solid-state memory as just mentioned, and performs a necessary signal process for audio data and records the resulting audio data.

Figure 7:
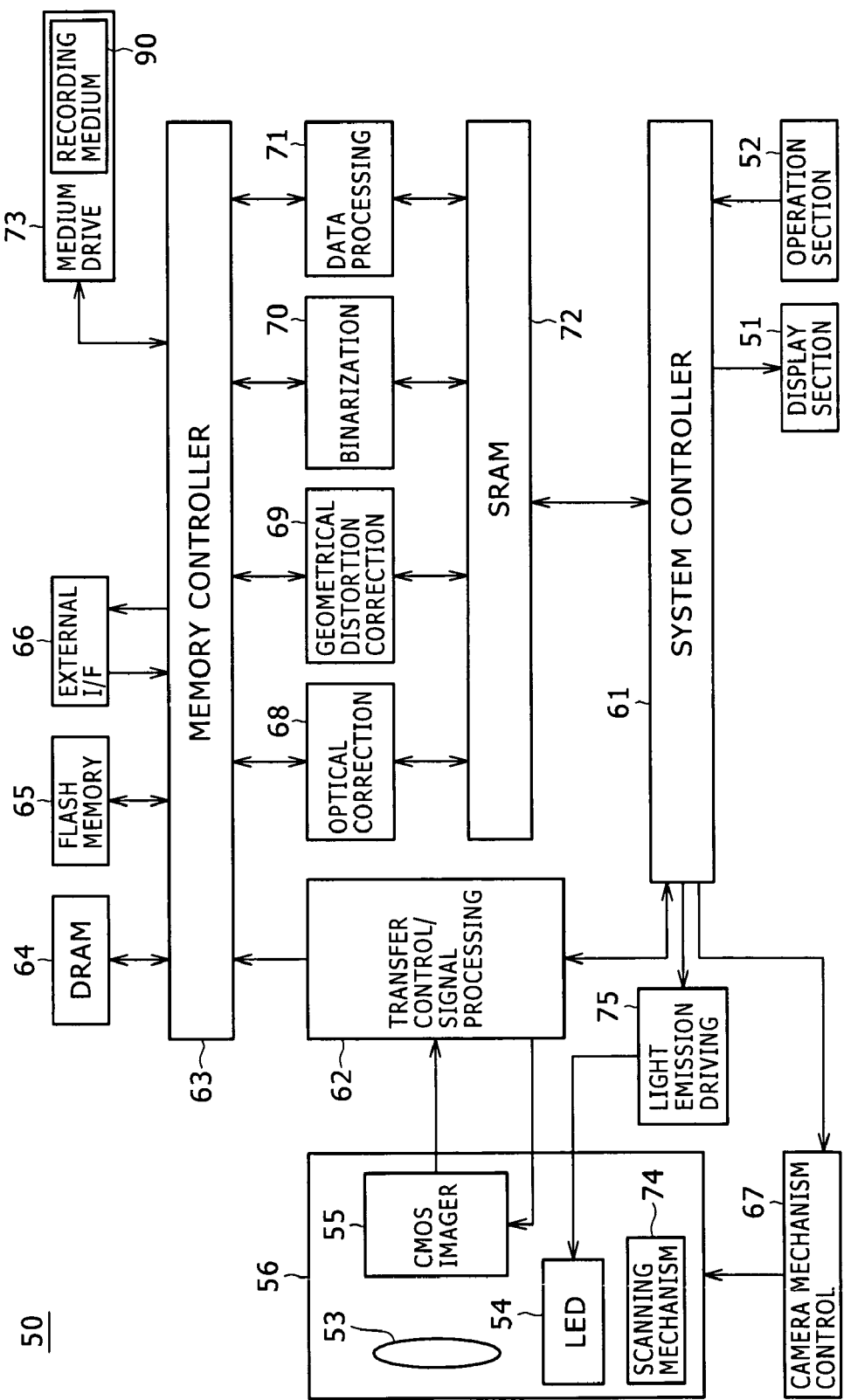
FIG. 7 is a block diagram of the reproduction apparatus.

It is to be noted that, though not shown in FIG. 7, naturally it is a possible idea for the reproduction apparatus 50 to additionally include a sound reproduction and outputting system which reproduces, for example, audio data recorded on the recording medium 90 by means of the medium drive 73 and decodes and outputs the reproduced audio data. Also it is possible to transfer audio data reproduced by the medium drive 73 to an external apparatus through the external interface 66. Furthermore, where audio data are recorded on a recording medium 90 of the portable type such as a CD, a DVD, a Blur-ray disk, an MD or an memory card as mentioned hereinabove, the user can cause the recording medium 90 to be reproduced on the external apparatus to enjoy music or the like read out from the hologram memory 1.

4. Reproduction Operation for the Hologram Memory

Figure 8:
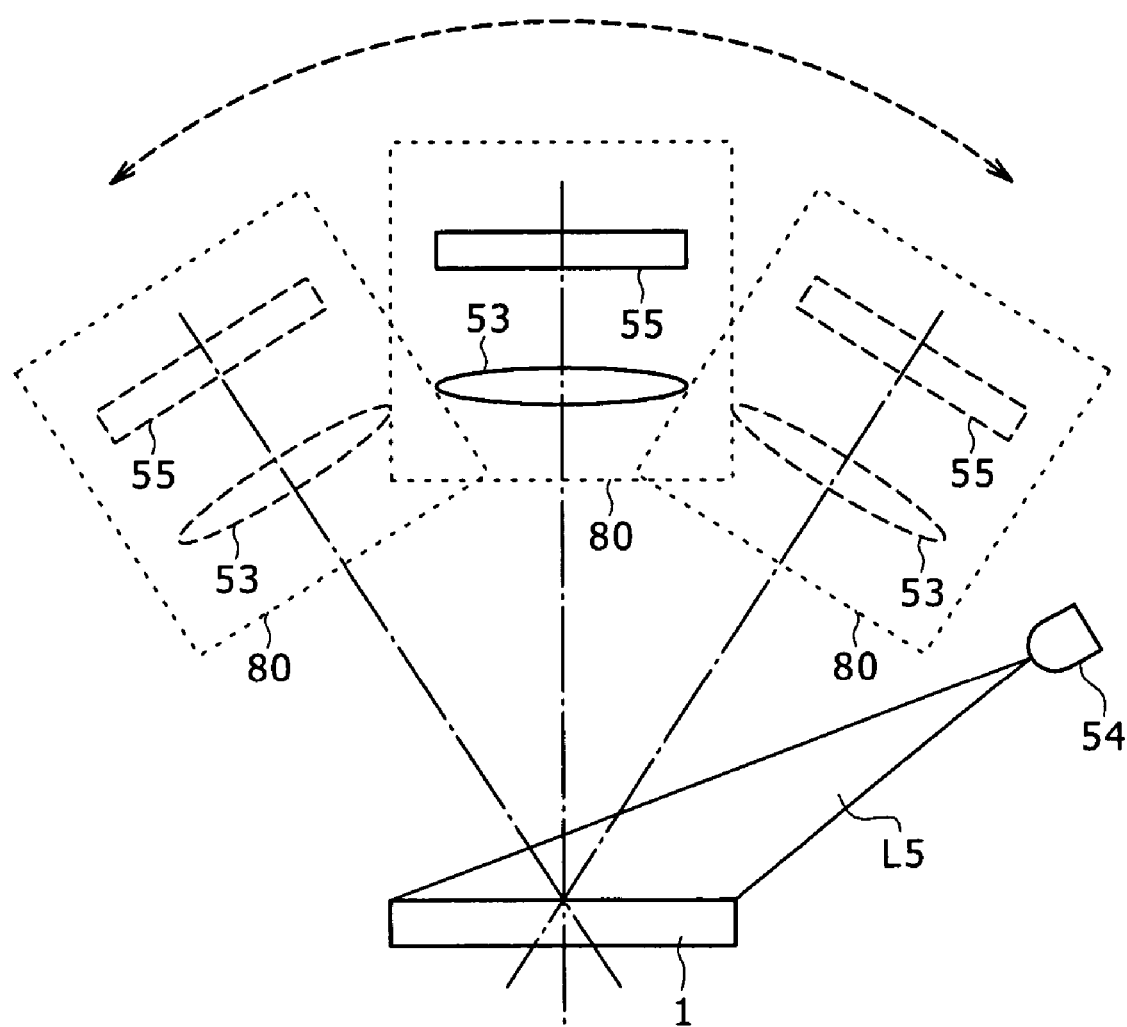
FIGS. 8, 9, 10, 11 and 12 are schematic views illustrating different reading operations by the reproduction apparatus.

An example of operation of reading data from the hologram memory 1 using a reproduction apparatus having, for example, such a configuration as described above is described. Although the method wherein various images are recorded using an HPO (Horizontal Parallax Only) type optical system with the angle of reference light fixed is described with reference to FIGS. 3, 5A and 5B, where such recording is performed, it is basically preferable to vary, upon reproduction, the angle of the imager while the angle of the reference light is fixed. FIG. 8 illustrates a reading method of the reproduction apparatus 50 wherein the angles of the image pickup lens system 53 and the imager 55 are varied. In particular, in the reproduction apparatus 50 having the lens moving section 53a as described hereinabove with reference to FIG. 6A, a movement unit 80 for moving the image pickup lens system 53 and the imager 55 integrally with each other within a movable range of the lens moving section 53a is formed. Then, the movement unit 80 is moved in the direction of revolution as seen in FIG. 8 by the scanning mechanism 74 shown in FIG. 7 to vary the angle of the image pickup direction with respect to the hologram memory 1. The light emitting element 54 for outputting reference light L5 for the reading remains at the fixed position. In particular, if the user performs an operation to issue an instruction to read the hologram memory 1 in a state wherein the reproduction apparatus 50 is opposed to the hologram memory 1, then the system controller 61 issues an instruction to the camera mechanism control section 67 to drive the scanning mechanism 74 to revolutionarily move the movement unit 80. At this time, the image pickup data of #1 to #x of FIG. 2 are obtained as image pickup data of reproduction images successively obtained by the imager 55, and audio data DA are obtained in the reproduction apparatus 50 in such a manner as described above.

Figure 9:
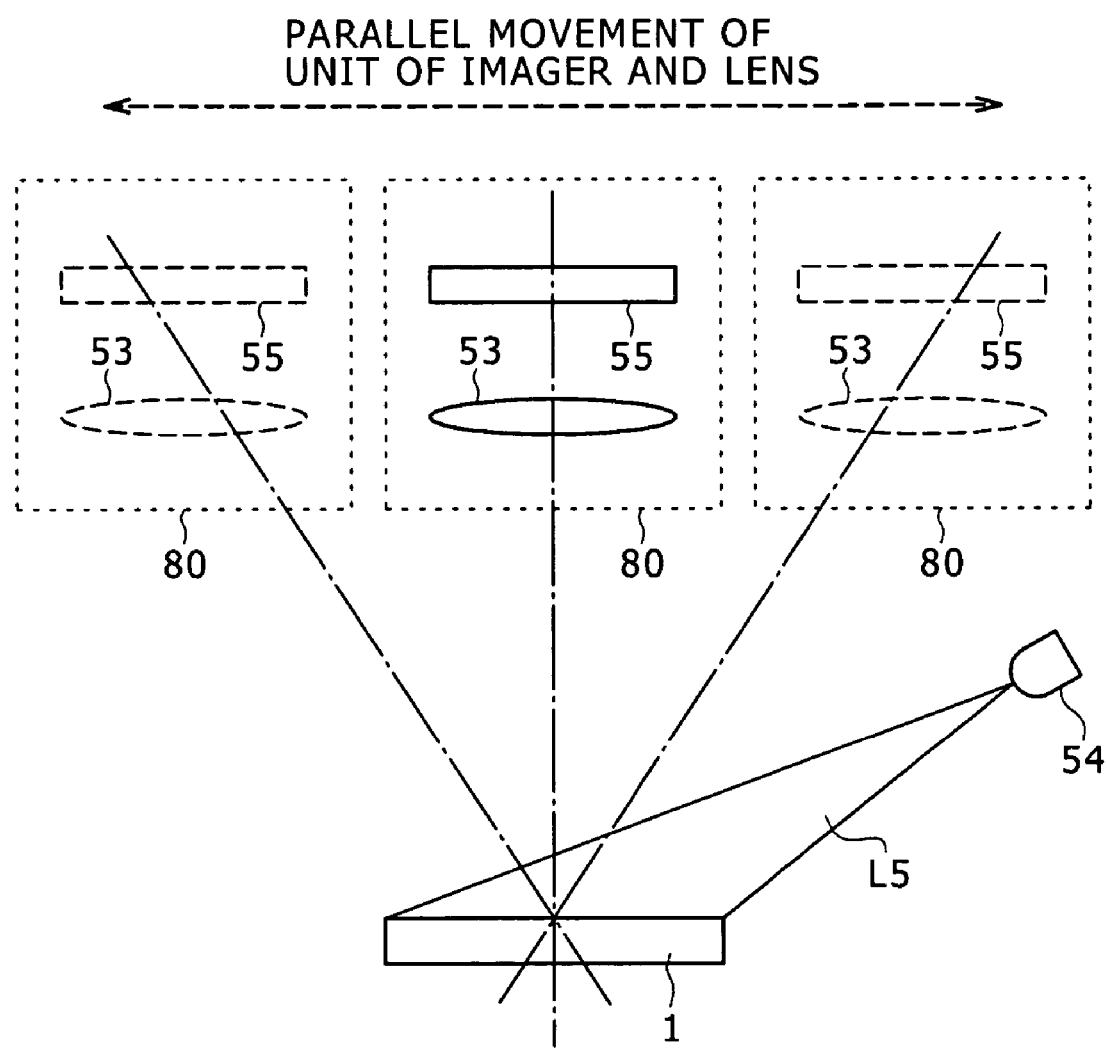
Figure 10:
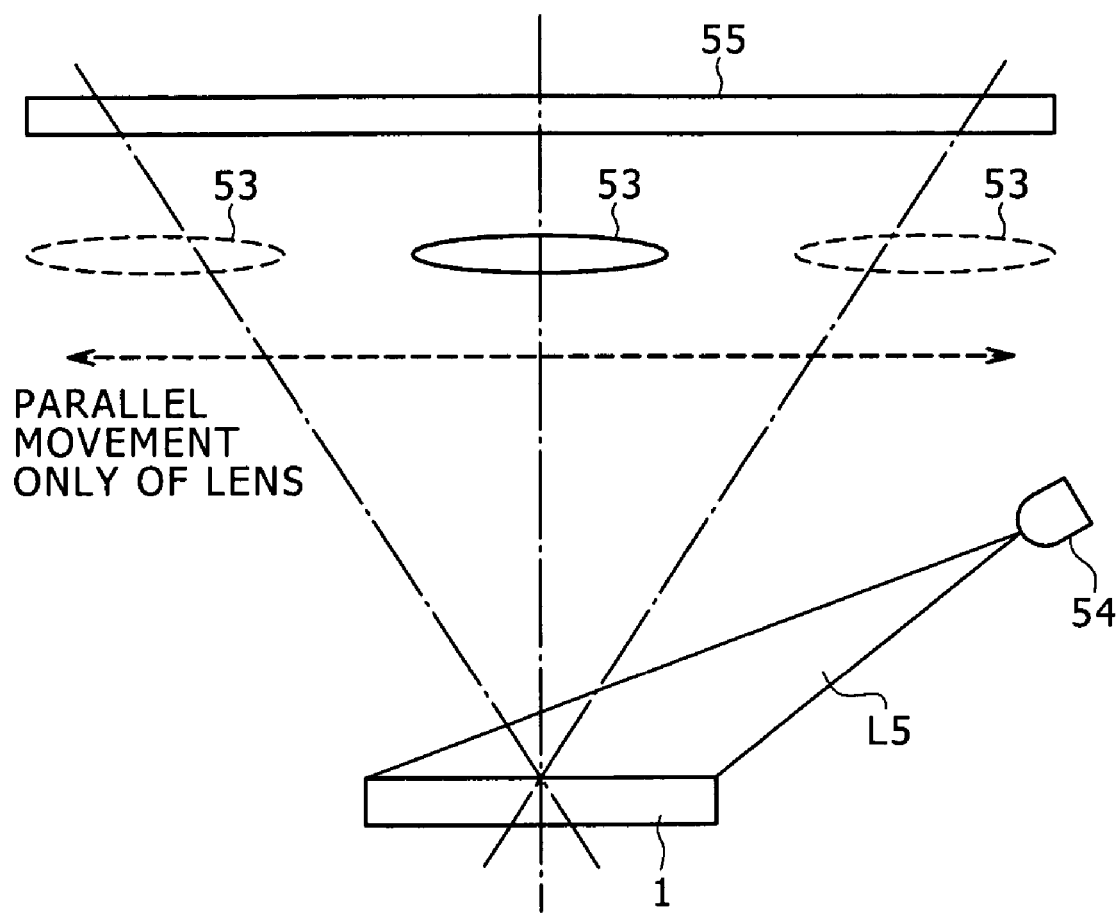

However, the movement unit 80 may not be moved in a revolutionary direction but may be moved parallelly as seen in FIG. 9. Where reproduction images are fetched through such parallel movement of the movement unit 80 in this manner, the mechanism for moving the movement unit 80 can be formed in a simple configuration. However, this configuration is disadvantageous in that a reproduction image is likely to be distorted, and a sufficient distortion correction process or the like is required. On the other hand, where the size of the imager 55 is sufficiently great, a configuration which moves only the image pickup lens system 53 as seen in FIG. 10 may be adopted.

Figure 11:
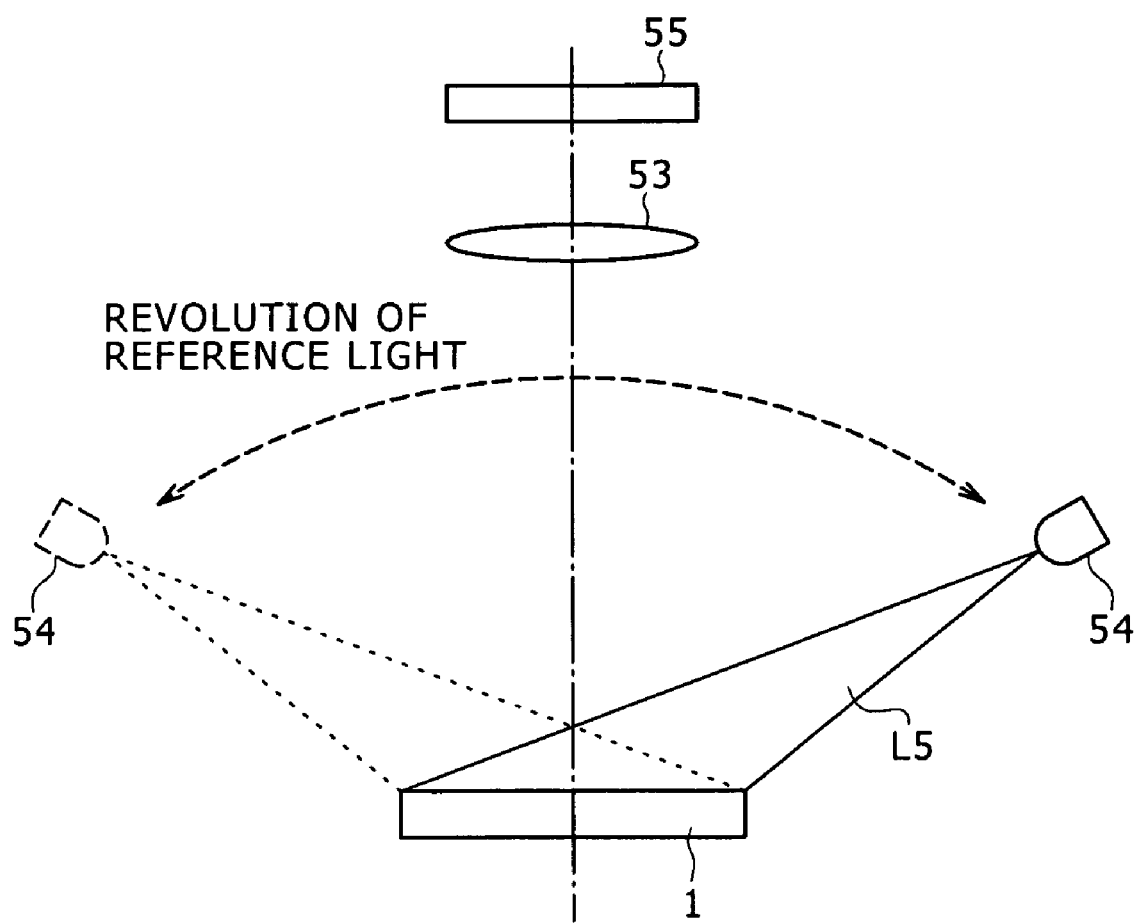

Alternatively, where such a configuration as described hereinabove with reference to FIG. 6B is used, the image pickup lens system 53 may be fixed while the light emitting element moving section 54a moves the light emitting element revolutionarily with respect to the hologram memory 1 so as to vary the angle of the reference light L5 to be irradiated upon the hologram memory 1 as seen in FIG. 11.

5. Hologram Memory and Reproduction Operation of Other Systems

While, in the embodiment described above, the present invention is applied to the hologram memory 1 of the holographic stereogram system, the present invention can be applied also to a hologram memory 1 of any other recording system. For example, the hologram memory may be of the angle-multiplexed recording type. It is known that, where a "thick recording medium" of photopolymer or the like is used, two or more holograms can be recorded at the same place. If this principle is utilized such that different recording patterns are recorded at the same place using different reference light beams, then the different recording patterns can be reproduced by varying the angle of reference light. In this instance, the reproduction apparatus 50 may be configured such that the irradiation angle of the reference light is moved in such a manner as described hereinabove with reference to FIG. 11. In this instance, data may be recorded such that an image can be visually recognized within an angular range of the reference light of, for example, θ2 (for example 80° to 100°) of FIG. 2 while a reproduction image of an image pattern derived from audio data DA appears within the other angular ranges of θ1 and θ3.

Figure 12:
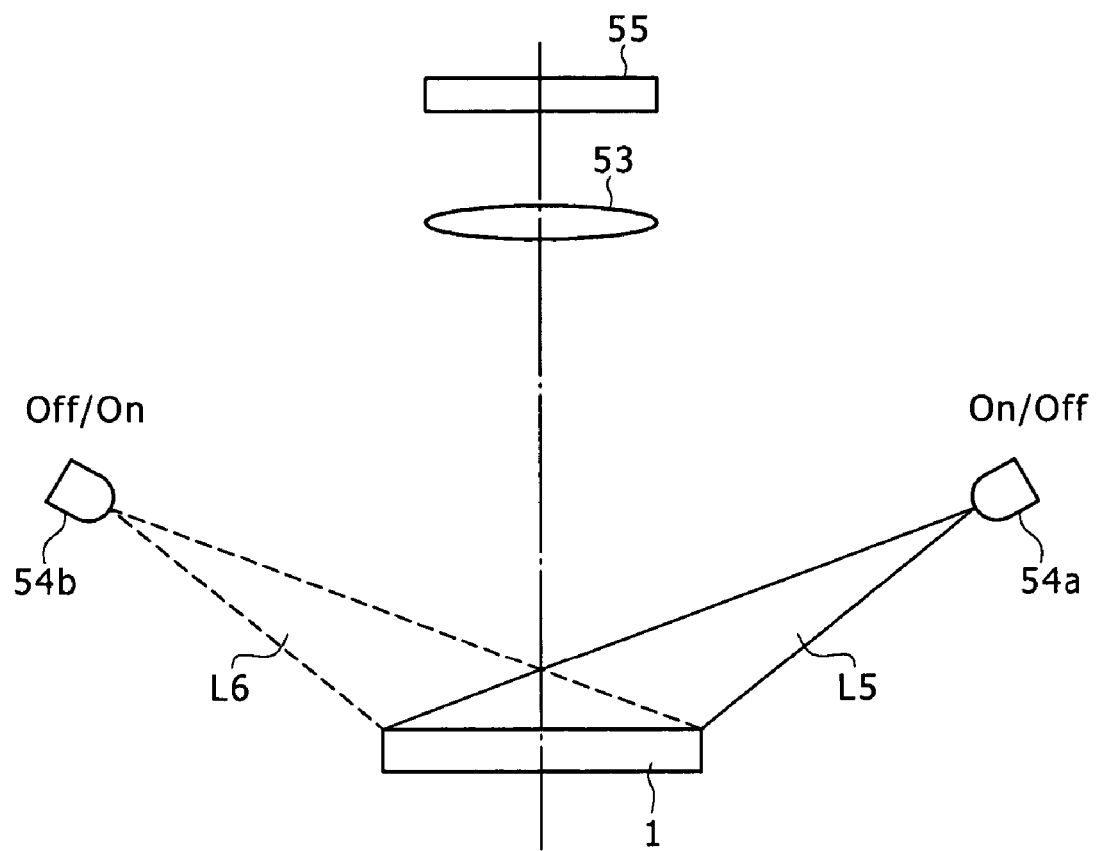

Also a wavelength-multiplexed recording method may be used. Since a recording medium of photopolymer or the like has a wavelength selectivity, if different recording patterns are recorded at the same plate using light sources of different wavelengths, then different recording patterns can be reproduced if reference light having a different wavelength is used. For example, if audio data are recorded using a green light source and image data are recorded using a red light source, then the audio data can be reproduced using green light as the reference light L5 upon reproduction by the light emitting element moving section 54a as seen in FIG. 12. Or, particularly where a light emitting element 54b which can irradiate red reference light L6 is used, then the images of the image data can be reproduced. Therefore, mixed existence of image data and audio data is permitted. Further, if the hologram memory 1 is observed with white light, then since the audio data look green while the images look red, the hologram memory 1 is superior also in design.

6. Effects of the Embodiment and Modifications

As described above, according to the present embodiment, the characteristic of high density recording of a hologram memory can be made the mode of to record a sufficient amount of computer data such as audio data DA, and when a person looks at the hologram memory 1 itself, the person can recognize an image. Therefore, the hologram memory 1 can be formed with a superior design property and a high value added. Further, the reproduction apparatus side can reproduce audio data DA recorded on the hologram memory 1 by fetching reproduction images observed within a predetermined range from the hologram memory 1 and extracting image patterns of the audio data DA.

Further, while, in the embodiment described above, reproduction images of image data DP can be visually observed substantially from the front with respect to the hologram memory 1 by a person, this arrangement allows the person to observe the reproduction images of the image data DP more readily and is suitable for enhancement of the design performance when the reproduction images are visually recognized. However, depending upon the situation or purpose of use, the hologram memory 1 may be formed otherwise such that reproduction images of image data DP can be observed not from the front but from an oblique direction. Further, if the hologram memory 1 is configured such that reproduction images of image patterns derived from audio data DA are observed within the range of the angle θ2 in FIG. 2, that is, from the front of the hologram memory 1, then the angular range of scanning by the scanning mechanism 74 of the reproduction apparatus 50 can be set to a narrow range, which provides an advantage that the configuration can be simplified suitably. Further, the image data DP may be formed such that, as a reproduction image therefrom, a three-dimensional image may be observed or a two-dimensional image different from a three-dimensional image may be observed.

Further, while, in the foregoing description, the data of the first form is computer data and audio data DA are recorded as computer data into the hologram memory 1, naturally a variety of computer data can be recorded. For example, still picture data, moving picture data, text data, or program/application data may be recorded in place of the audio data DA described hereinabove. Also the configuration of the reproduction apparatus is not limited to that described hereinabove with reference to FIG. 7. Also an output form of computer data such as the audio data DA reproduced from the hologram memory 1 may assume various forms. Further, the hologram memory 1 itself may be sold and provided, as a providing medium of computer data such as audio contents, in the form of a package medium like a CD or a DVD, which are currently distributed generally, to users. Or, the hologram memory 1 may be formed on a poster, a book or the like by adhesion or printing such that a user can acquire audio data or the like using a reproduction apparatus.

In the present invention, for example, image data which can be visually recognized as recording data of a second form are recorded in a mixed manner in an optical recoding medium as a hologram memory in which recording data of a first form such as computer data are recorded. Therefore, there is an advantage that an optical recording medium having a high design property and having an interesting appearance can be implemented while the original purpose of a data recording medium is satisfied. Further, according to the reproduction apparatus and the reproduction method of the present invention for the optical recording medium described above, an appropriate data reproduction process can be achieved by reading out reproduction images of recording data of the first and second forms from the optical recording medium and then extracting the recording data of the first form.

While a preferred embodiment of the present invention has been described using specific terms, such description is for illustrative purposes only, and it is to be understood that changes and variations may be made without departing from the spirit or scope of the following claims.

What is claimed is:

1. An optical recording medium including data recorded thereon as interference fringes, the interference fringes expressed as interference object light of images obtained for individual recording units from the recorded data relative to reference light, comprising:
   a recording region in which recorded data of a first form is recorded, recorded data of the first form being functional computer data; and
   another recording region in which recorded data of a second form is recorded, the recorded data of the second form being visually recognizable image data recorded to said optical recording medium to be perceptible to a visual sense of a human being.

2. The optical recording medium according to claim 1, wherein the computer data is audio data.

3. The optical recording medium according to claim 1, wherein the recorded data of the second form is recorded to be observed upon observation from a direction substantially perpendicular to a recording plane of said optical recoding medium.

4. The optical recording medium according to claim 1, wherein the recorded data of the individual recording units recorded on said optical recording medium are individually observed at different observation positions with respect to a fixed reference light.

5. The optical recording medium according to claim 1, wherein the recorded data of the individual recording units recorded on said optical recording medium are individually observed at different reference light positions with respect to a fixed observation position.

6. The optical recording medium according to claim 1, wherein the recorded data of the first form recorded on said optical recording medium are recorded using reference light of a first wavelength, and the recorded data of the second form are recorded using reference light of a second wavelength different from the first wavelength.

7. The optical recording medium according to claim 1, wherein the recorded data of the first form includes identification data for identifying the recorded data as recorded data of the first form.

8. The optical recording medium according to claim 1, wherein recorded data of the first form includes an error correction code.

9. The optical recording medium of claim 1, wherein the optical recording medium is circular, and the another recording region is included in an angular region of the optical recording medium separate from an angular region of the optical recording medium that includes the recording region.

10. The optical recording medium of claim 1, wherein the recorded data of the first form is a bar code not being substantively recognizable with the visual sense of the human being.

11. The optical recording medium of claim 1, wherein the image data of the second form is observable from an oblique direction with respect to the optical recording medium.

12. A reproduction apparatus for reproducing an optical recording medium including data recorded thereto as interference fringes, the interference fringes expressed as interference object light of images obtained for individual recording units from the recorded data relative to reference light, the optical recording medium including recorded data of a first form being functional computer data and recorded data of a second form being visually recognizable image data recorded to said optical recording medium to be perceptible to a visual sense of a human being, comprising:
   reference light outputting means for outputting reading out reference light;
   detection means for detecting reproduction images of individual recording units recorded on the optical recording medium while the reading out reference light is applied to the optical recording medium by said reference light outputting means; and
   reproduction processing means for converting the reproduction images of the individual recording units detected by said detection means into a data string and for extracting only the data of the first form from the data string and processing the extracted data as reproduction data.

13. The reproduction apparatus according to claim 12, wherein said reference light outputting means irradiates the reading out reference light while the position thereof is fixed with respect to the optical recording medium, and said detection means successively changes the observation position thereof with respect to the optical recording medium to successively detect the reproduction images of the individual recording units.

14. The reproduction apparatus according to claim 12, wherein said reference light outputting means irradiates the reading out reference light while the position thereof is successively changed with respect to the optical recording medium, and said detection means is positioned at a fixed observation position and successively detects the reproduction images of the individual recording units in response to the change of the position of the reading out reference light.

15. The reproduction apparatus according to claim 12, wherein the recorded data of the first form recorded on the optical recording medium is recorded using reference light of a first wavelength and the recorded data of the second form is recorded using reference light of a second wavelength different from the first wavelength, and said reference light outputting means outputs the reference light of the first wavelength.

16. The reproduction apparatus according to claim 12, wherein the recorded data of the first form recorded on the optical recording medium includes identification data for identifying the recorded data as recorded data of the first form, and said reproduction processing means extracts only the data of the first form based on the identification data.

17. The reproduction apparatus according to claim 12, wherein the recorded data of the first form recorded on the optical recording medium includes an error correction code, and said reproduction processing means extracts only the data of the first form based on a result of a correction process performed using the error correction code.

18. A reproduction method for reproducing an optical recording medium including data recorded thereto as interference fringes, the interference fringes expressed as interference object light of images obtained for individual recording units from the recorded data relative to reference light, the optical recording medium including recorded data of a first form being functional computer data and recorded data of a second form being visually recognizable image data recorded to said optical recording medium to be perceptible to a visual sense of a human being, comprised:

detecting, at a reproduction apparatus, reproduction images of individual recording units recorded on the optical recording medium while reading out reference light is applied to the optical recording medium; and converting, at the reproduction apparatus, the reproduction images of the individual recording units detected by the detection step into a data string and for extracting only the data of the first form from the data string and processing the extracted data as reproduction data.

19. The method of claim 18, wherein the reproduction apparatus includes a light emitting mechanism, and a microprocessor that controls the light emitting mechanism.

20. A reproduction apparatus for reproducing an optical recording medium including data recorded thereto as interference fringes, the interference fringes expressed as interference object light of images obtained for individual recording units from the recorded data relative to reference light, the optical recording medium including recorded data of a first form being functional computer data and recorded data of a second form being visually recognizable image data recorded to said optical recording medium to be perceptible to a visual sense of a human being, comprising:

a reference light outputting unit configured to output reading out reference light;

a detection unit configured to detect reproduction images of individual recording units recorded on the optical recording medium while the reading out reference light is applied to the optical recording medium by said reference light outputting unit; and a reproduction processing unit configured to convert the reproduction images of the individual recording units detected by said detection unit into a data string and for extracting only the data of the first form from the data string and processing the extracted data as reproduction data.

\* \* \* \* \*